United States Patent [19]
Hibbs

[11] Patent Number: 5,387,012
[45] Date of Patent: Feb. 7, 1995

[54] OWNER IDENTIFICATION FOR EYEWEAR

[76] Inventor: Dawn W. Hibbs, 10 Monserrat, Foothill Ranch, Calif. 92610

[21] Appl. No.: 165,084

[22] Filed: Dec. 10, 1993

[51] Int. Cl.⁶ ............................................. B42D 15/00
[52] U.S. Cl. ........................................ 283/75; 283/81; 40/665
[58] Field of Search ............... 283/81, 74, 75; 40/630, 40/665; 428/40–43

[56] References Cited

U.S. PATENT DOCUMENTS 5,227,209  7/1993  Garland .............................. 40/630 X Primary Examiner—Willmon Fridie
Attorney, Agent, or Firm—Francis X. LoJacono

[57] ABSTRACT

An owner identification label for use in combination with eyeglasses and adapted to be affixed to the inner surface of a suitable frame member, more specifically to the inner surface of one of the temple members, wherein the front surface of the label is formed to receive suitable indicia thereon for the printing of the owner's name, address and/or telephone number, the rear surface being provided with a suitable adhesive for fixedly mounting the label. A second embodiment is included which is made from a metallic foil having a plurality of extended ear members for securing the label to one of the temple members.

2 Claims, 1 Drawing Sheet

OWNER IDENTIFICATION FOR EYEWEAR

BACKGROUND OF THE INVENTION

1. Field of the Invention

This invention relates generally to eyewear and more particularly to means for owner identification of all types of eyeglasses including sunglasses and the like.

2. Description of the Prior Art

There exists a serious problem of retrieving eyewear that has been inadvertently lost by the owner. This is due to the fact that eyewear such as eyeglasses and sunglasses are constructed with design configurations that normally do not lend themselves to be marked with any suitable owner identification. Since there are many types of eyewear in use today the term "eyeglasses" will be hereinafter referred to represent all types of eyewear.

Until now, identification of eyeglasses has been restricted to the markings or indicia printed or embossed on the various eyeglass cases that might be employed to protect and store the respective glasses. That is, usually the name and address of the optometrist is imprinted on the case or within an area inside the case. The owner will often mark the case with some type of identification, either on the inside or preferably on the outer surface of the case. Often owners will try to provide a home address or at least his or her phone number by using some type of ink that will hopefully not wear off. However, many eyeglass cases have an outer surface that are generally not conducive for marking by pen and ink devices. Some owners will paste identifying labels to their eyeglass case. This method has two problems, one being that the label sometimes will not stick for very long to the surface of the case and also if is does the printing eventually wears off.

It is important to note that the most common time that eyeglasses are lost is when they are not safely placed back into their protective case. Thus, eyeglass cases with or without one's glasses are rarely lost. As is often the case, the wearer of glasses will remove his or her eyeglasses for several reasons such as resting one's eyes to alleviate discomfort or to see better in a different optical range. It is at this time that they are often put down and forgotten.

Eyeglasses are extremely expensive because they generally consist of prescription lenses which are usually of little or no use to anyone finding them.

Accordingly, there is a need for a more permanent marking or labeling arrangement of a pair of eyeglasses so that the glasses could be more easily reclaimed, thus sparing the wearer the expense and inconvenience of replacing the lost eyeglasses.

OBJECTS AND ADVANTAGES OF THE INVENTION

It is an important object of the present invention to provide a means whereby an owner can identify his or her eyeglasses so that when the glasses are inadvertently lost they can by their marking or indicia be returned to the owner.

Another object of the invention is to provide a label that is easily secured to the frame structure by means of a suitable adhesive backing, wherein the label is arranged to have the owner's name, address, and/or phone number printed thereon.

Still another object of the present invention is to provide a means for identifying one's eyeglasses wherein the label has a suitable configuration for attachment along the inside of one of the temple members.

A further object of the invention is to provide an alternative arrangement of an identifying labeling means wherein the label is formed from a very thin suitable metal that can be embossed with the owner's name, address and/or phone number.

A still further object is to provide an identification device of this character wherein the label can be mounted on any portion of the eyeglass frame member such as on the rims that support the lenses.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts.

DETAILED DESCRIPTION OF THE INVENTION

Figure 1:
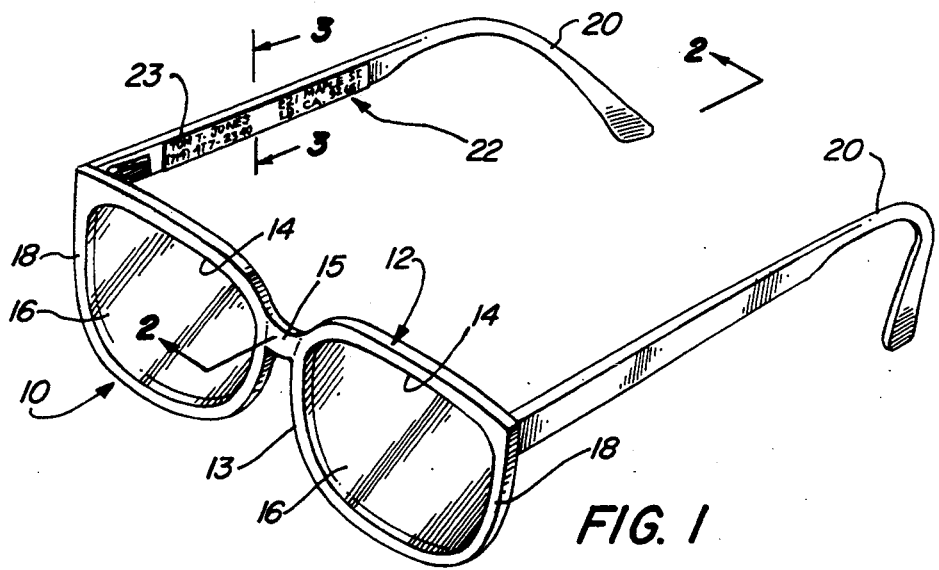
FIG. 1 is a perspective view of a pair of eyeglasses showing the inside of the of the temple members on which is attached a label according to the present invention.
Figure 2:
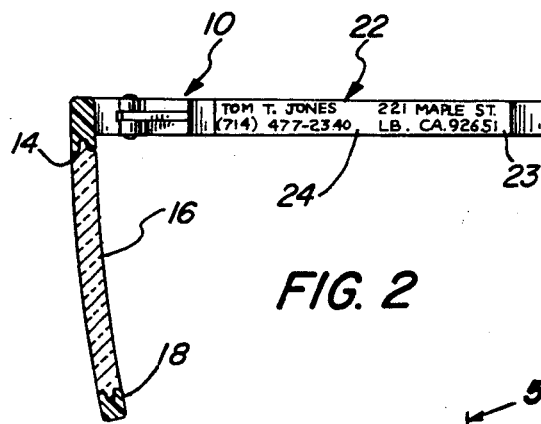
FIG. 2 is an enlarged cross-sectional view taken substantially along line 2—2 of FIG. 1.
Figure 3:
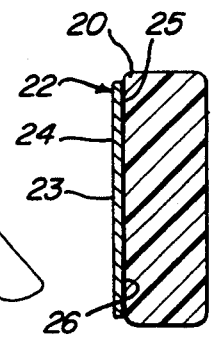
FIG. 3 is an enlarged cross-sectional view taken along line 3—3 of FIG. 1.

Referring now to the drawing in detail and more particularly to the views that are represented in FIGS. 1, 2 and 3 thereof, there is illustrated a typical pair of eyeglasses, generally indicated at 10, that comprise a frame structure 12 having a main frame member 13 which includes a pair of peripheral frame members that define side-by-side openings 14 that are separated by a bridge 15 that allows the frame to rest on one's nose. Mounted within the pair of openings 14 is a glass lens 16 that is supported within each peripheral frame member 18. A pair temple side members 20 are hingedly attached at the respective outer portions of frame members 18.

Both in FIGS. 1 and 2, there is shown an owner identification means, generally indicated at 22. In this embodiment of the invention the owner identification means 22 is illustrated as a label 23 which is affixed to the inner surface of temple member 20 and is provided with a rectangular configuration substantially identical to that of the width of the temple member to which it is fixedly mounted. It should be noted, however, that the configuration can be arranged to be secured across bridge 15 and adjacent frame members 18, if the configuration of frame structure 12 so allows.

Owner identification means 22 is formed from a suitable flexible material such as paper, coated paper or a plastic material that has a front surface 24 which is compatible for identifying indicia to be typed or written thereon. As can be seen in FIGS. 1 and 2, the indicia indicates a persons name, address and phone number.

The back surface 25 of the label is provided with a suitable securing means such as an adhesive, as indicated at 26 in FIG. 3.

Figure 4:
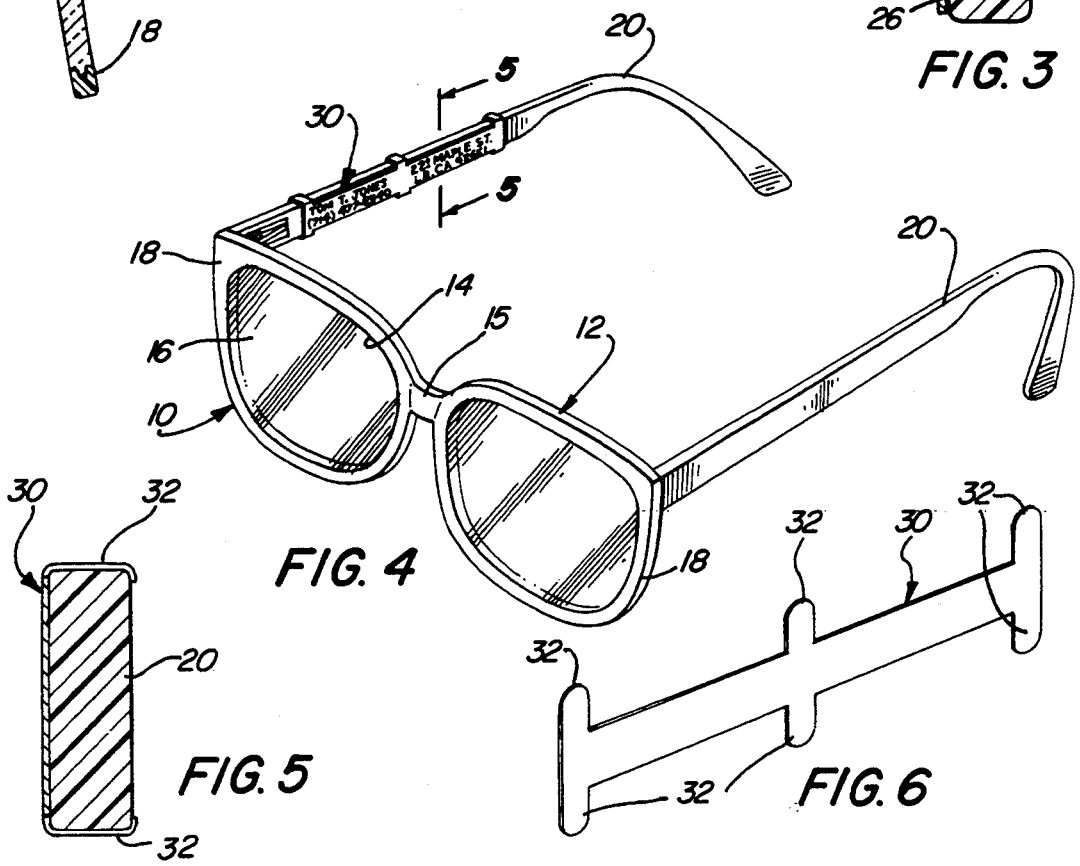
FIG. 4 is a perspective view of another pair of eyeglasses showing an alternative arrangement of the invention illustrating a clip-on identification label.
Figure 5:
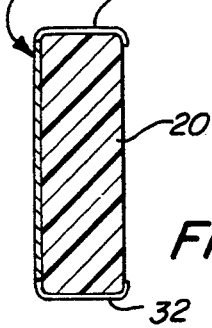
FIG. 5 is an enlarged cross-sectional view taken substantially along line 5—5 of FIG. 4.
Figure 6:
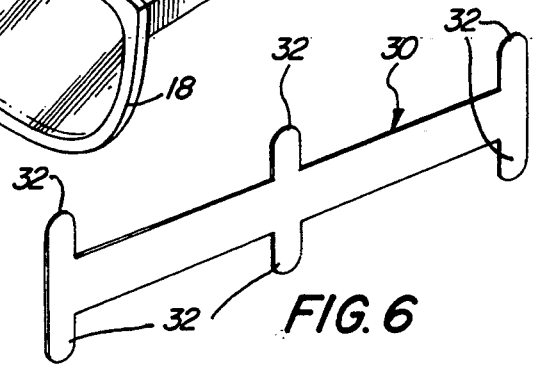
FIG. 6 is an enlarged perspective view of a blank clip-on identification label.

Referring now the alternative embodiment as illustrated in FIGS. 4, 5 and 6, there is shown a label 30 which is formed from a suitable thin metal such as a heavy foil having an elongated rectangular configuration that can be readily embossed with indicia or by having a front surface that can be written on as mentioned above. This arrangement of the label is more suitable for mounting along the temple members 20, as illustrated in FIG. 4 and 5. The flat sheet of metal is formed with a plurality of extended ear members 32 which are adapted to be bent and formed around either temple member 20 for removably attaching the identification label as may be required. Accordingly, the bendable ear members 32 provide a simple means for attaching and removing the label when needed. Since no adhesive material is required the label can be safely removed from one pair of eyeglasses and remounted on another pair of eyeglasses. It also allows one to remove the metal label when the glasses become dirty and need to be cleaned or if a second pair of glasses are to be used by the wearer thereof.

The foregoing is a description of a preferred embodiment of the invention which is given here by way of example only. The invention is not to be taken as limited to any of the specific features as described, but comprehends all such variations thereof as come within the scope of the appended claims.

What I claim is:

1. In combination, a pair of eyeglasses comprising a frame structure having frame members including a pair of peripheral frame members that are separated by a bridge and a pair of temple members, wherein the improvement comprises an owner identification means mounted on one of said temple members, identifying indicia printed thereon, and means for attaching said owner identification means to said frame structure;

wherein said owner identification means comprises a flat sheet of metal foil having a surface on which said identifying indicia is printed, and said attaching means is defined by a plurality of ear members formed on said flat sheet of metal foil for removably attaching to said temple member.

2. An owner identification means for a pair eyeglasses comprising:

an identification label having a front surface and a rear surface formed to be fixedly mounted to eyeglasses;

identifying indicia printed on said front side of said identification label;

means for affixing said owner identification label to the eyeglasses;

wherein said identification label is formed from a thin flat sheet of metal foil, and wherein said identifying indicia is printed on said front surface of said identification label, and said affixing means is defined by a plurality of bendable ear members extending from the peripheral edge of said metal foil, whereby said identification label is removably attached to the eyeglasses.

* * * * *